United States Patent
Jackson et al.

(10) Patent No.: US 12,158,395 B2
(45) Date of Patent: Dec. 3, 2024

(54) LEAK DETECTION SYSTEM AND METHOD

(71) Applicant: Aquatrace Limited, Naas (IE)

(72) Inventors: Diarmuid Jackson, Bray (IE); Gerard Shortt, Dublin (IE)

(73) Assignee: Aquatrace Limited, Naas (IE)

( * ) Notice: Subject to any disclaimer, the term of this patent is extended or adjusted under 35 U.S.C. 154(b) by 163 days.

(21) Appl. No.: 18/010,396

(22) PCT Filed: Feb. 22, 2021

(86) PCT No.: PCT/EP2021/054358
§ 371 (c)(1),
(2) Date: Dec. 14, 2022

(87) PCT Pub. No.: WO2021/165547
PCT Pub. Date: Aug. 26, 2021

(65) Prior Publication Data
US 2023/0314264 A1   Oct. 5, 2023

(30) Foreign Application Priority Data
Jul. 23, 2020   (EP) .................................... 2011387

(51) Int. Cl.
*G01R 31/08*   (2020.01)
*E04D 13/00*   (2006.01)
*G01M 3/16*   (2006.01)

(52) U.S. Cl.
CPC .............. *G01M 3/16* (2013.01); *E04D 13/006* (2013.01)

(58) Field of Classification Search
CPC .......... G01M 3/16; G01M 3/165; G01M 3/40; G01N 27/223; G01N 27/226; G01N 27/228; G01R 1/06794; G01R 27/2605
See application file for complete search history.

(56) References Cited

U.S. PATENT DOCUMENTS 5,081,422 A   1/1992   Shih
7,872,479 B2 *   1/2011   Lorenz .................... G01M 3/16
                                               428/57

(Continued)

FOREIGN PATENT DOCUMENTS

WO          9110889 A1     7/1991
WO       2019063494 A1     4/2019

OTHER PUBLICATIONS

International Search Report and Written Opinion for International Patent Application No. PCT/EP2021/054358, mailed Jul. 21, 2021, 22 pages.

*Primary Examiner* — Thang X Le
(74) *Attorney, Agent, or Firm* — Withrow & Terranova, P.L.L.C.

(57) ABSTRACT

A system for detecting a leak in a building layer comprising a plurality of dual foil insulation panels arranged to cover at a base building surface, each panel including: an insulating body and upper and lower conductive layers covering, respectively, upper and lower surfaces of the insulating body. The system comprising: a plurality of upper electrodes formed by respective rows of electrically interconnected upper conductive layers of the panels; a plurality of lower electrodes formed by respective transverse rows of electrically interconnected lower conductive layers of the panels; and a control circuitry configured to: apply a voltage between the upper and lower electrodes to measure an electrical property therebetween; and detect the presence of a leak within the building layer based on a measurement of the electrical property between the upper and lower electrodes.

15 Claims, 6 Drawing Sheets

(56) References Cited

U.S. PATENT DOCUMENTS

| | | | |
|---|---|---|---|
| 9,157,828 B2 * | 10/2015 | Jaman | E04D 13/006 |
| 11,105,096 B2 * | 8/2021 | Baggs | B32B 5/26 |
| 2017/0205308 A1 | 7/2017 | Wassarman et al. | |
| 2019/0094103 A1 * | 3/2019 | Jackson | G01M 3/165 |

* cited by examiner

LEAK DETECTION SYSTEM AND METHOD

This application is a 35 USC 371 national phase filing of International Application No. PCT/EP2021/054358, filed Feb. 22, 2021, which claims priority to European patent application no. 21708172.8, filed Jul. 23, 2020, the disclosures of which are incorporated herein by reference in their entireties.

FIELD

The present invention relates to a leak detection system and method for detecting a leak in a building layer, such as a roof or floor.

BACKGROUND

In the construction of a building, it is challenging to provide a watertight layer, especially a waterproof flat roof or basement. Many enterprises solely provide either leak prevention or leak repair services.

Currently, it is difficult to determine if a flat roof has been successfully waterproofed until a leak presents itself internally, potentially causing damage. This is also true for roof degradation, where it is not possible to determine if the roof has degraded significantly until a leak presents internally.

The detection and location of a leak within a building is inherently difficult. A major issue with a leak presenting internally is that the source and the scale of the leak is unknown. It is particularly difficult to identify and locate the leak in time to prevent any damage to the internal structure or personal property, as well as the associated additional repair or legal costs.

Where it is not possible to locate a leak accurately, it is often necessary to replace a disproportionately large area of a roof in order to repair what may be a small leak ingress point. This approach has a significant level of risk as there is no guarantee that the area selected covers the leak (or multiple leaks) or that the repaired roof was replaced properly without any new leak points.

For example, devices are currently employed to detect the presence of a fluid due to a leak. However, these devices only detect a leak at a specified point (typically within few square millimetres) and need the fluid to come into direct contact with their sensor, which only covers a small percentage of the monitored area.

WO2019/063494 discloses a system for detecting and locating a leak in a building layer, comprising a sensing module including at least one cell. The cell includes a major surface juxtaposed a portion of a first surface of the building layer and incorporating at least one pair of mutually spaced electrodes defining a sensing path extending parallel to the cell major surface. Sensing circuitry is cooperable with the cell and configured to apply a voltage between the cell electrodes to measure an electrical property therebetween. The sensing circuitry can further cooperate with a probe arranged to be applied to a second surface of the building layer, opposite the first surface, and is configured to apply a voltage between at least one of the cell electrodes and the probe to measure an electrical property therebetween. Control circuitry is operatively associated with the sensing circuitry and configured to: detect the presence of a leak within the portion of the first surface based on at least a first measurement from the sensing circuitry of the electrical property between the cell electrodes; and locate a point of leakage within the identified portion of the first surface based on at least a second measurement from the sensing circuitry of the electrical property between the probe and at least one of the cell electrodes.

US 2017/0205308 discloses a system for detecting and locating liquids comprising at least one sensor tile, wherein each sensor tile includes a first plurality of conductive lines attached to a first side of a substrate and a second plurality of lines attached to a second side of a substrate. The first plurality of conductive lines is arranged to be offset 90 degrees with respect to the second plurality of conductive lines. The system also contains at least one processor operably connected to the first and second plurality of conductive lines by at least two multiplexer pieces. The sensor tiles, multiplexer pieces, and processor are interconnected by conductive connectors.

SUMMARY

According to the present invention there is provided a leak detection system for a building layer according to claim 1.

Embodiments of the system employ dual foil backed insulation panels, that are conventionally used for the insulation of a roof or floor, as building blocks for a leak detection array, wherein the upper and lower conductive layers of the insulation panels are used to form respective upper electrodes and transverse lower electrodes for detecting a leak based on measuring an electrical property therebetween.

Thus, by using the conductive properties of the metallic foils of the insulation panels for proving a leak sensing grid of electrodes, the embodiments of the system do not require additional extra layers or wiring of the monitored roof or floor area for leakage detection.

In some embodiments of the system, when a leak is detected by means of the grid of electrodes formed by the upper and lower conductive layers of the insulation panels, the system is further capable of more exactly locating the leak point, with a spatial resolution of few mm$^2$, by measuring an electrical property between a probe and at least one of the lower conductive layers or the upper conductive layers of the insulation panels.

BRIEF DESCRIPTION OF THE DRAWINGS

Embodiment of the invention will now be described, by way of example, with reference to the accompanying drawings, in which.

DESCRIPTION OF THE EMBODIMENT

Figure 1:
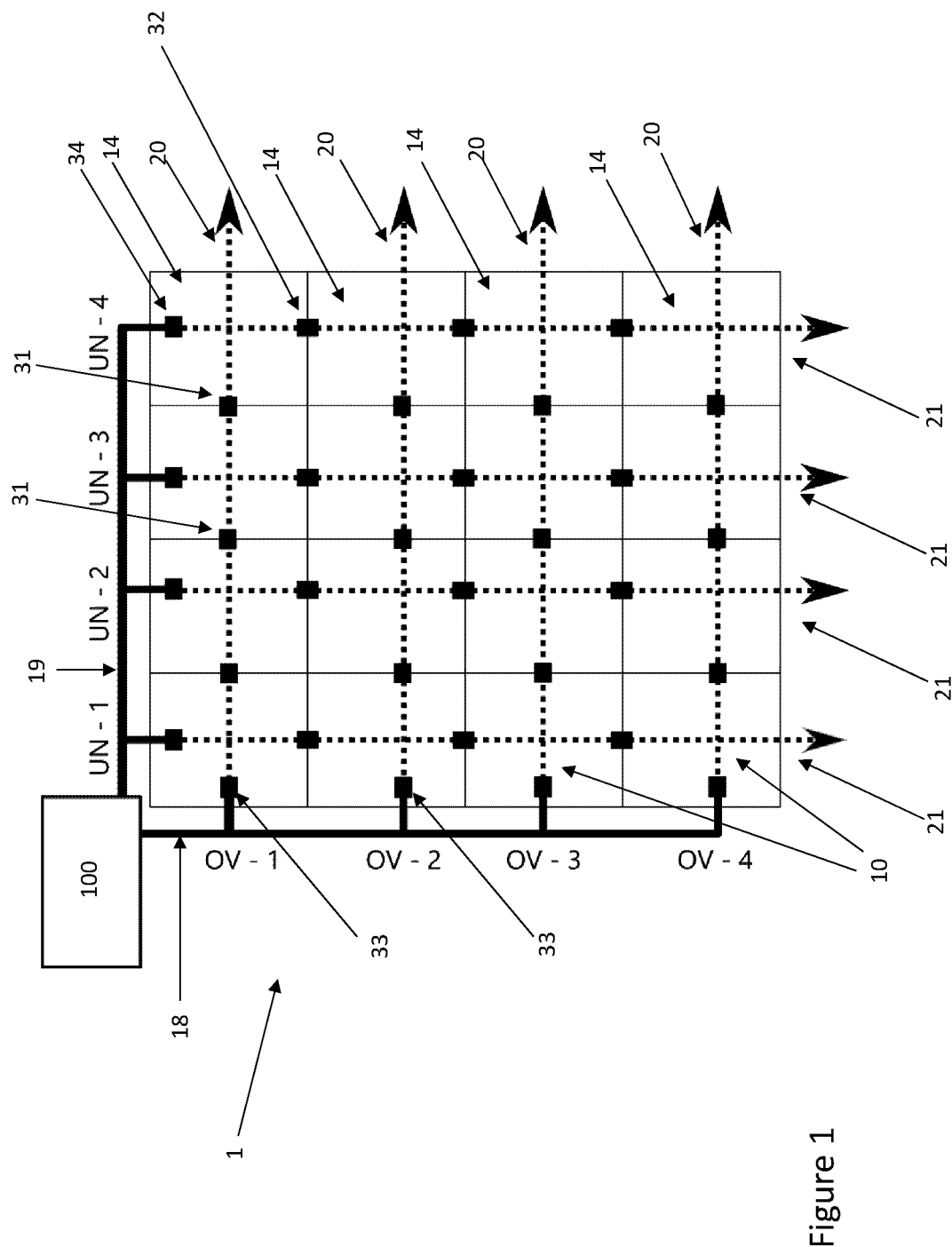
FIG. 1 is a top view of the basic layout of at least a portion of a leak detection system according to an embodiment of the invention.
Figure 2:
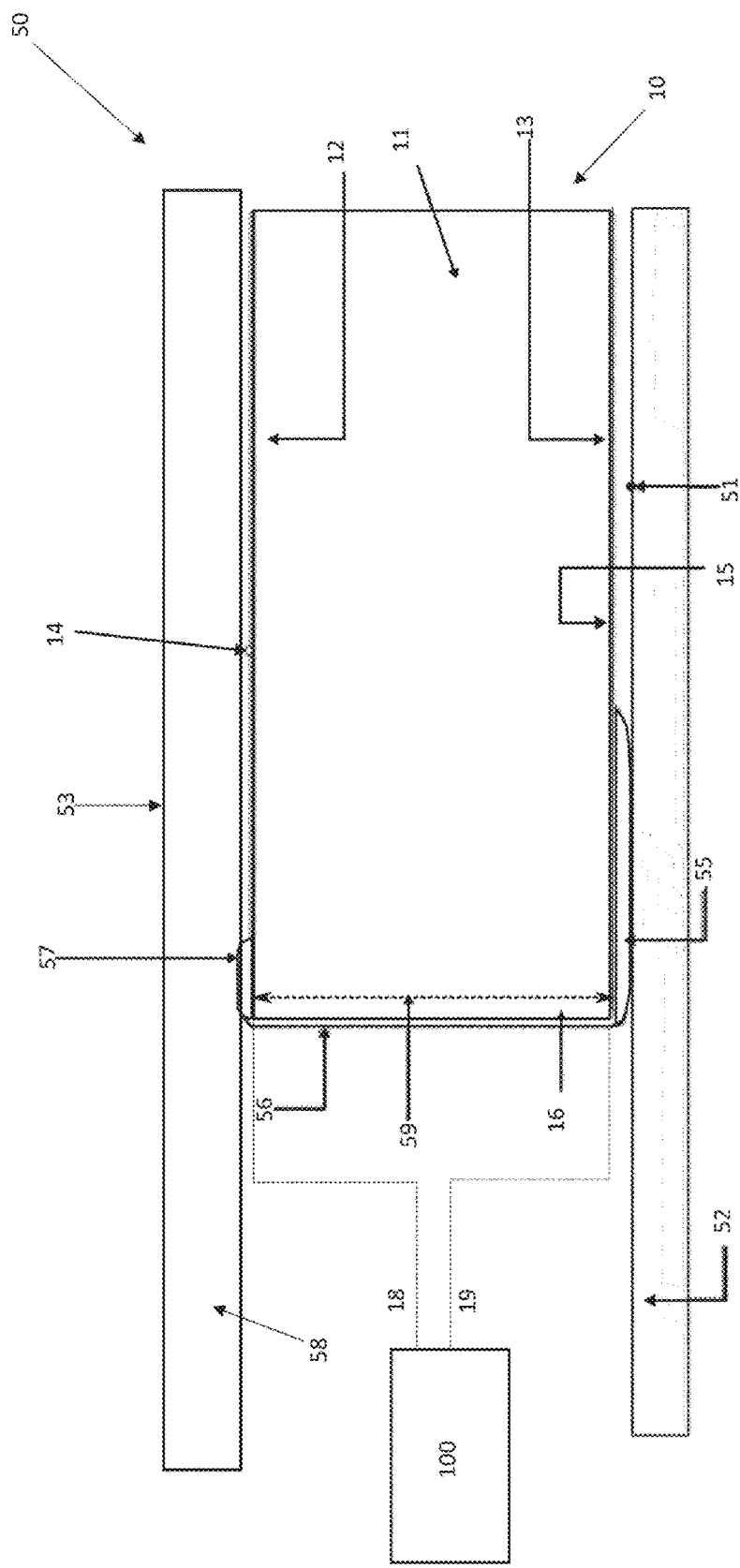
FIG. 2 shows at least a portion of a dual foil insulation panel of the system of FIG. 1, covering a base surface of the building layer.

With reference to FIG. 2, the present disclosure is related to a system capable of accurately detecting a leak in a building layer 50, the system comprising a plurality of dual foil backed insulation panels 10 arranged side-by-side to cover a surface 51 of a base portion 52 of the building layer 50 as shown in FIG. 1. Without limitation, the building layer 50 can be for example a roof, a basement, a floor, or a ceiling of a building, so that the panels are substantially co-planar when laid on the surface 51.

Referring back to FIG. 2, each panel 10 comprises: a substantially rigid body 11 made of insulating material such as blown polyurethane, an upper conductive layer 14 covering an upper surface 12 of the insulating body 11, and a lower conductive layer 15 covering a lower surface 13 of the insulating body 11. For example, the upper and lower foils of the panel 10, forming the upper and lower conductive layers 14, 15, can be made of Aluminium, as for example in the Kooltherm™ insulation panels provided by Kingspan®.

Figure 3:
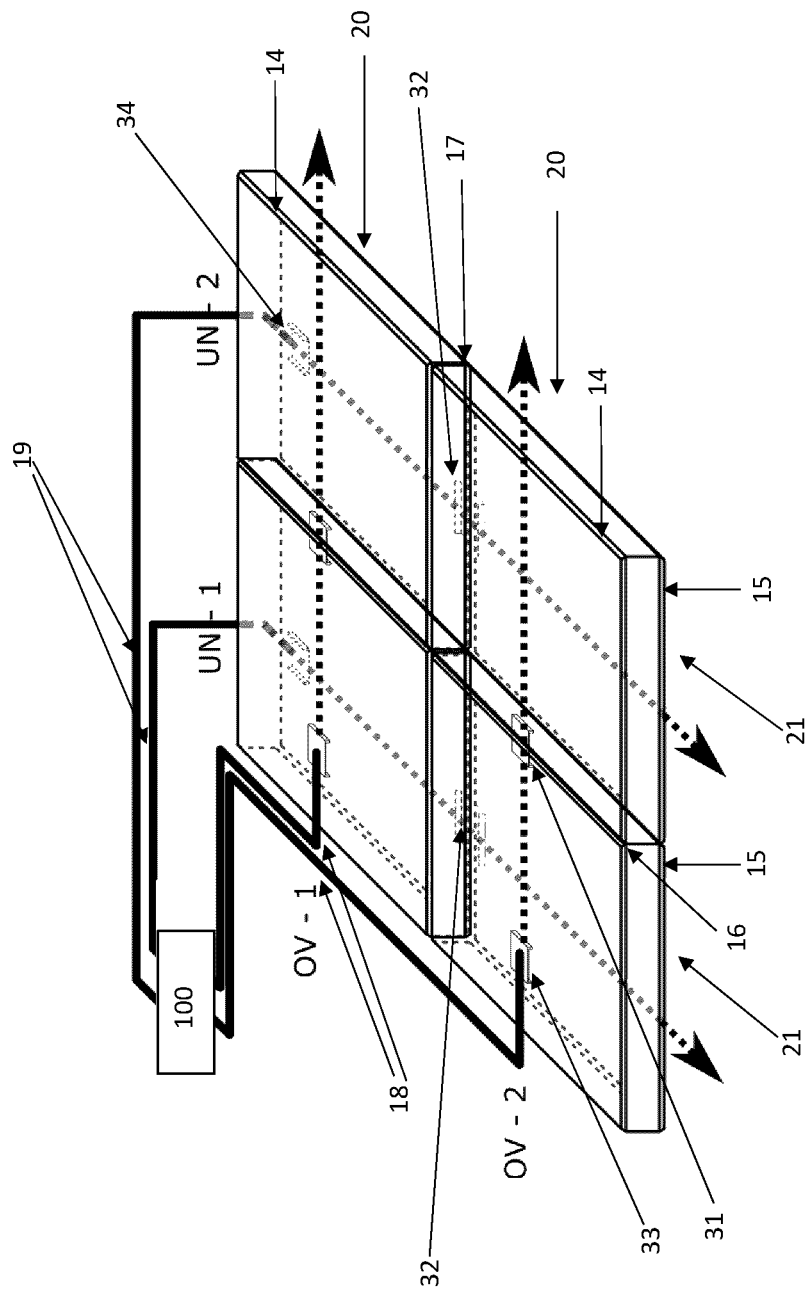
FIG. 3 is a perspective view of a portion of the system illustrated in FIG. 1.
Figure 4:
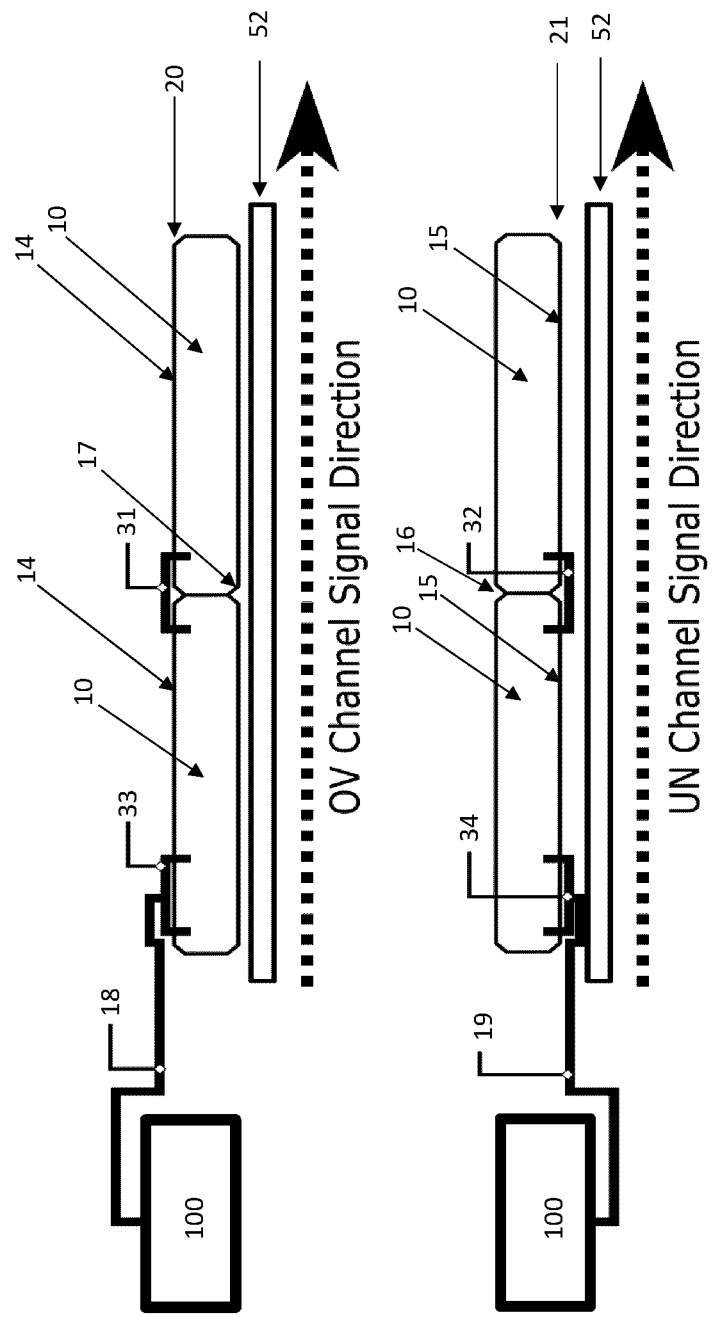
FIG. 4 shows two side views of a portion of the system illustrated in FIG. 1.

With reference to FIGS. 3-4, when arranged side-by-side on the building base surface 51, the upper conductive layers 14 of adjacent panels 10 are separated by gaps 16, and the lower conductive layers 15 of adjacent panels 10 are separated by gaps 17.

FIG. 1 illustrates the basic layout of at least a portion of the system 1. As can be appreciated with reference also to the isometric view of FIG. 3 and the side views of FIG. 4, the system 1 comprises:

a plurality of upper electrodes 20 formed by electrically interconnecting respective rows of upper conductive layers 14 of the panels 10; and a plurality of lower electrodes 21 formed by electrically interconnecting respective rows of lower conductive layers 15 of the panels 10.

The rows of interconnected upper conductive layers 14 used to form the upper electrodes 20 are transverse to the rows of interconnected lower conductive electrodes 15 used to form the lower electrodes 21. In this way, a grid of transverse upper and lower electrodes 20, 21 is provided to monitor the building base surface 51, wherein the electrodes 20, 21 are separated from each other by the insulating body 11 of the respective panels 10.

Figure 5:
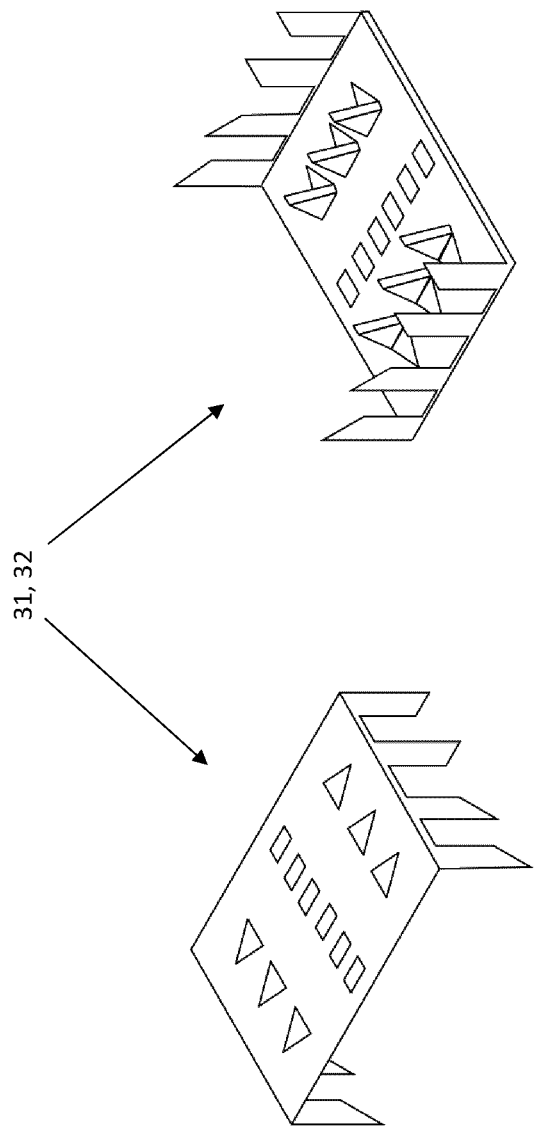
FIG. 5 illustrates two perspective views of a connector that can be used to interconnect rows of conductive layers of adjacent insulation panels of the system illustrated in FIG. 1, according to an embodiment of the invention.

In the embodiment illustrated in the attached Figures, the interconnections between the conductive layers 14 forming each of the upper electrodes 20 and the interconnections between the lower conductive layers 15 forming each of the lower electrodes 21 are simply realized during the construction of the building layer 50, using, for example, Tiger clips 31, 32 made of aluminium (or other conductive material) for bridging conductive layers 14 of adjacent panels 10 over the gaps 16 therebetween, and for bridging conductive layers 15 of adjacent panels 10 over the gaps 17 therebetween. An example of Tiger clips 31, 32 that can be used for the interconnections is illustrated in FIG. 5.

In particular, rows of clips 32 can be disposed on the base surface 51 of the building layer 50 under construction and pressed into position by sequentially laying the panels 10 onto the base surface 51, such that lower conductive layers 15 of respective rows of panels 10 are bridged together by the clips 32 along a first direction. After laying the panels 10 on the base surface 51, rows of clips 31 are pressed in place into the insulating body 11 of the panels 10, such that conductive layers 14 of respective rows of panels 10 are bridged by the clips 31 along a second direction perpendicular to the first direction. Then, a further portion 58 of the building layers 50 can be built over the panels 10, FIG. 2.

Although the use of Tiger clips 31, 32 is disclosed above, it is to be noted that any type of conductive clip or other conductive connector can be used to form the electrical interconnections between the conductive layers 14 and between the conductive layers 15, for realizing the grid of upper and lower electrodes 20, 21 of the system 1.

Indeed in further variants of the disclosed embodiments, discrete connectors may not be required for connecting one or both layers 14, 15 and the panels may be shaped so that when they slot into one another, the required connections are made between upper and/or lower layers 14, 15.

The grid of upper and lower electrodes 20, 21 so obtained is advantageously used by the system 1 to detect the presence of a leak within the building layer 50.

In particular, with reference again to FIGS. 1 and 3-4, the upper electrodes 20 and the lower electrodes 21 define respective upper and lower signal channels OV-1, OV-2 . . . OV-4 and UN-1, UN-2 . . . UN-4 that extend transverse to each other and are electrically separated by the insulating body 11 of the panels 10. Thus, an open circuit is realized, preventing a charge flowing between the signal channels OV-1 . . . OV-4, UN-1 . . . UN-4 provided by the upper electrodes 20 and lower electrodes 21.

The system 1 further comprises control circuitry 100 configured to sequentially apply a voltage between selected pairs of upper and lower electrodes 20, 21 of the grid and to measure, when the voltage is applied to a pair of upper and lower electrodes 20, 21, an electrical characteristic, for example, capacitance therebetween. In the example of FIG. 1, these pairs would comprise: {OV-1, UN-1}, {OV-1, UN-2} . . . . {OV-2, UN-1}, {OV-2, UN-2} . . . {OV-4, UN-4}. Thus, the control circuitry 100 can be configured to apply a voltage to a first upper electrode 20 of the system 1 forming the signal channel OV-1 and while the voltage is applied to this first upper electrode 20, sequentially apply a voltage to each of the lower electrodes 21 forming the signal channels UN-1 . . . UN-4, so as to sequentially generate a voltage difference between the first upper electrode 20 and each of the lower electrodes 21. When the voltage difference is applied between the first upper electrode 20 and a given lower electrode 21, the control circuitry 100 can collect measurement signals running along the signal channels provided by the first upper electrode 20 and the given lower electrode 21, to measure a capacitance therebetween. When a capacitance has been measured between the first upper electrode 20 and each of the lower electrodes 21, the control circuitry 100 can proceed to sequentially apply a voltage to each of the other upper electrodes 20 and while the voltage is applied to one of these upper electrodes 20, sequentially apply a voltage to the lower electrodes 21 so as to complete the capacitance measurement for each pair of upper and lower electrodes 20, 21 of the system 1.

In more detail, in order to sense capacitance between a pair of upper and lower electrodes 20, 21, the control circuitry 100 is configured to pulse the applied voltage, preferably within a radio frequency range, e.g. between 30 kHz and 1 MHz. While the voltage generated by the control circuitry 100 is applied between the pair of upper and lower electrodes 20, 21, an analogue voltage signal between these electrodes 20, 21 can be collected, via the respective signal channels OV and UN, by the control circuitry 100 (where the analogue signal can be filtered for removing high frequency fluctuation components, and be converted into a digital signal for further analysis). This analogue signal is indicative of the capacitance of the sensing zone between the pair of upper and lower electrodes 20, 21, corresponding to the insulating body 11 between the upper conductive layer 14 and the lower conductive 15 of the panel 10 at the intersection between the pair of upper and lower electrodes 20, 21.

With reference again to FIGS. 1-4, there is shown how the control circuitry 100 is operatively connected to the upper electrodes 20 and lower electrodes 21 via respective wiring 18 and 19, for providing the voltage to the upper and lower electrodes 20, 21 and for collecting the measurement signals provided back from the respective signal channels OV-1 . . . OV-4 and UN-1 . . . UN-4.

In more detail, the control circuitry 100 comprises a plurality of first ports or connection points, each assigned to one of the upper signal channels OV-1 . . . OV-4. Wiring 18 run along a first peripheral side of the layout of panels 10, for connecting each of the first ports or connection points of the control circuitry 100 with the corresponding assigned upper signal channels OV-1 . . . OV-4. In particular, the wiring 18 is connected to respective first conductive layers 14 of the upper electrodes 20 defining the upper signal channels OV-1 . . . OV-4, via connectors 33 (e.g. Tiger clips 33).

The control circuitry 100 further comprises a plurality of second ports or connection points, each assigned to one of the lower sensing channels UN-1 . . . UN-4. Wirings 19 run along a second peripheral side of the layout of panels 10, transverse to the first side, for connecting each of the second ports or connection points of the control circuitry 100 with the corresponding assigned lower signal channels UN-1 . . . UN-4. In particular, the wiring 19 is connected to respective first conductive layers 15 of the lower electrodes 21 defining the lower signal channels OV-1 . . . OV-4, via connectors 34 (e.g. Tiger clips 34). The wiring 18, 19 can be connected to the control circuitry 100 via a punch-down block.

With reference now back to FIG. 2, a liquid 55 can be present at a portion of the base surface 51 monitored by the grid of upper and lower electrodes 20, 21, due to a leak 56 passing through the insulating body 11 of the illustrated panel 10, from a leak ingress point 57 located between the upper conductive layer 14 of the panel 10 and the building portion 58 covering the panel 10.

The leak 56 can provide an electrical path 59 that alters the electrical characteristic of the sensing zone between the upper and lower conductive layers 14, 15 of the panel 10. In more detail, electrons can pass thought the electrical path 59 bridging the upper and lower conductive layers 14, 15, thus increasing the capacitance therebetween with respect to a capacitance value present in the absence of electrical bridging (that can be measured during calibration of the system 1).

This capacitance increase can be used to detect the leak 56 within the panel 10. Indeed, this capacitance increase causes a decrease in the voltage signal between the pair of upper and lower electrodes 20, 21 including the conductive layers 14, 15 of the panel 10, that can be detected by the control circuitry 100 by applying a pulsed voltage between the pair of upper and lower electrodes 20, 21 and collecting measurement signals from the OV and UN sensing channels corresponding to the electrodes 20, 21. As the quantity of liquid between the upper and lower conductive layers 14, 15 increases, the voltage signal therebetween reduces. Thus, the measured voltage signal can be indicative not only of the presence of a leak within the panel 10, but also of the level of leak.

For the leak detection to happen, a small quantity of liquid can be at least briefly attenuated though the insulating body 11, in order to form and maintain the electrical channel 59 between the upper and lower conductive layers 14, 15 in a quantity and for a time sufficient to detect the capacitance changing.

This attenuation can be achieved in various ways, such as but not limited to one or a combination of:

- using a naturally hydrophilic material for forming the insulating body 11 of the panels 10;
- adding one or more attenuation layers (e.g. a hydrophilic paint, tape, etc. . . . ), such as the attenuation layer 16 illustrated for example in FIG. 2;
- mechanically altering the insulating body 11 to channel liquid or allow for liquid to be attenuated; and
- chemically altering the insulating body 11 to channel liquid or allow for liquid to be attenuated.

The sensing of changes in conductivity occurring in the sensing zone between the upper and lower conductive layers 14, 15 can be improved by swapping the polarity of the voltage applied to the upper and lower electrodes 20, 21 including the layers 14, 15, during the reading of the voltage signal therebetween.

This solution is based on the electrode connected to a live line (anode electrode) being more sensitive to changes in capacitance in the sensing zone than the other electrode connected to the common line (cathode electrode). As such, at the beginning of a leakage through the insulating body 11, it could be advantageous to have the upper conductive layer 14 acting as an anode electrode with greater sensitivity. On the other end, as the leak progresses, it could be advantageous to have the lower conductive layer 15 acting as an anode electrode with greater sensitivity. Swapping the polarity of the voltage applied between the conductive layers 14, 15 can provide an adequate sensitivity regardless the stage of the leakage.

While in the above disclosed embodiment the control circuitry 100 is configured to measure a change of capacitance, an alternative solution involves configuring the control circuitry 100 to measure a change of impedance in the sensing zones between each pairs of upper and lower electrodes 20, 21. This can be done by pulsing the electrode polarized as anode with an alternating current and measuring the resulting change in the electrode polarized as cathode. The difference between the signals at a pair of upper and lower electrodes 20, 21 represents the impedance of the sensing zone therebetween. The presence of liquid within this zone changes the measured impedance, which can then be used by the control circuitry 100 to detect a leak.

Alternatively, the sensor circuitry 100 can be configured to measure a change of resistance between the pairs of upper and lower electrodes 20, 21 to detect a leakage.

In practice, the control circuitry 100 operates by sequentially applying a voltage signal between the pairs of upper and lower electrodes 20, 21 forming the sensing grid of the system 1. This signal is used by the control circuitry 100 to constantly monitor, via signals collected from the sensing channels OV-1 . . . OV-4, UN-1 . . . UN-4, for a change of an electrical property between each pair of the upper and lower electrodes 20, 21 being monitored, that is indicative of a presence of electrical bridging between the conductive layers 14, 15 of the panel 10 in common to the pair of upper and lower electrodes 20, 21. When a creation of the electrical bridging is detected between the pair of upper and lower electrodes 14, 15, this is indicative of the presence of leakage in the panel 10.

Alternatively, the voltage signal can be concurrently applied between the upper and lower electrodes 20, 21, to constantly monitor, via the sensing channels OV-1 . . . OV-4, UN-1 . . . UN-4, for the presence of signals indicative of electrical bridging between the conductive layers 14, 15 of the upper and lower electrodes 20, 21. In this alternative, in case that multiple electrical bridges are concurrently present between upper and lower electrodes 20, 21, since the sensing channels OV-1 . . . OV-4, UN-1 . . . UN-4 convey superimposed signals for each electrical bridge, a presence of leaks can be detected, but it may be not possible to discriminate at which panels 10 the leaks occurred.

Once the presence of leakage has been detected within the building layer 50, the measurement values, panel identifier (address) and time may be recorded and stored by the control circuitry 100. Furthermore, the control circuitry 100 can generate an alarm, to give an instant alert, and report the leak detection locally (e.g. through a local user interface, UI, such as an LCD screen) and/or remotely. For example, the control circuitry 100 can push an alert notification to operators, for further assistance in leak localization and repair.

With reference back to FIG. 4, it will be appreciated that the length of the sensing channels OV1 . . . OV4, UN1 . . . UN4 of the system 1 depends on the number of adjacent panels 10 used to form the respective rows of interconnected upper conductive layers 14 and lower conductive layers 15 (a typical length for a panel 10 being between 1-2 meters). However, the maximum length of the sensing channels OV1 . . . OV4, UN1 . . . UN4 so obtained is limited by practical issues, e.g. related to attenuation of the conveyed electrical signals. Thus, in case that an extensive building area is to be covered by a large number of panels 10, each row of panels 10 can be divided in adjacent subsets of panels 10, each used to form corresponding upper channels OV as described above. In particular, each of the OV sensing channels formed along a same row of panels 10 starts at a corresponding panel 10 that is wired back to the control circuitry 100. In a similar way, each column of panels 10 can be divided in adjacent subsets of panels 10, each used to form corresponding lower signal channels UN as described above. In particular, each of the UN sensing channels formed along a same column of panels 10 starts at a corresponding panel 10 that is wired back to the control circuitry 100.

As explained below, the system 1 allows a leak to be detected within the building layer 50 to a resolution corresponding to the area of one panel 10, that is typically of some $m^2$ (assuming that the ports/connections points of the control circuitry 100 have been correctly connected, via the wiring 18, 19, to the assigned upper and lower signal channels OV-1 . . . OV-4, UN-1 . . . UN-4). Thus, a leakage location using the above disclosed basic system 1 is limited in resolution to the size of the panels 10 and is also based on correctly matching the upper and lower electrode address provided by the control circuitry 100 to the physical location of the corresponding panel 10 on the building layer 50.

In extensions of this embodiment, the control circuitry 100 can be adapted to connect to a probe 70 as disclosed in WO2019/063494 and to monitor for changes in an electrical property between the probe 70 and the lower conductive layer 15 of a panel 10 that has been identified as being effected by leakage, using the sensing grid provided by the upper and lower electrodes 20, 21. The use of the probe 70 allows for locating the leak more precisely within the identified panel surface.

Figure 6:
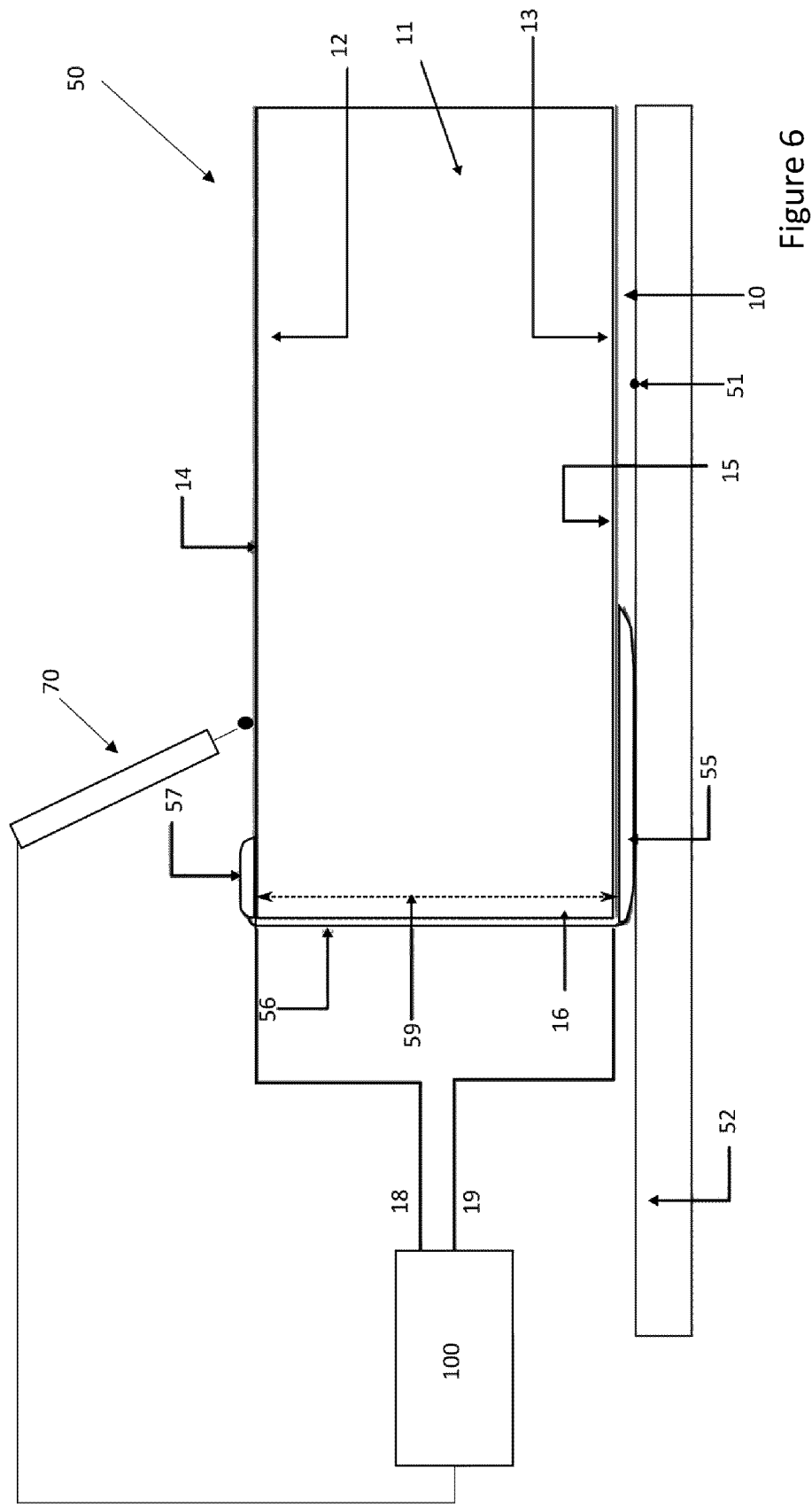
FIG. 6 illustrates a use of the system of FIG. 1 in cooperation with a probe to locate a detected leak according to an embodiment of the invention.

For example, FIG. 6 illustrates an embodiment of the sensing circuitry 100 in a situation where a leak occurred at and has been detected by means of the upper and lower electrodes 20, 21, within the illustrated panel 10. In this case, an operator has removed the covering portion 52 of the building layer 50 to apply the probe 70 on the upper conductive layer 14 of the panel 10 (that remains unelectrified during the leakage localization)—but this may not be necessary in all cases. In this embodiment, the sensing circuitry 100 is configured to apply a voltage between the probe 70 and the lower conductive layer 15 of the panel 10, to measure an electrical property between the probe 70 and the lower conductive layer 15.

For example, in order to operate a capacitance sensing between the probe 70 and the lower conductive layer 15, the control circuitry 100 is configured to pulse the voltage between the probe 70 and the lower conductive layer 15 at a radio frequency range, e.g. between 30 kHz and 1 MHz. When such pulsed voltage is applied, an analogue voltage signal between the probe 70 and the lower conductive electrode 15 can be provided to the control circuitry 100. This voltage signal is indicative of the capacitance value between the probe 70 and the lower conducive electrode 15.

The control circuitry 100 can be configured to periodically swap the polarity of the voltage applied between the probe 70 and the lower conductive layer 15. In this way, interference effects between the probe 70 and the environment are mitigated, since the connection of the probe 70 with a live line is alternated with the connection a common line.

Alternatively, the sensing circuitry 100 can be configured to apply a voltage between the probe 70 and the lower conductive electrode 15, without swapping its polarity, wherein preferably the probe 70 is kept connected to the common line and the lower conductive layer 15 is kept connected to the live line.

With reference back to FIG. 6, the leak 59 within the insulating body 11 of the panel 11 acts to alter the electrical properties between the lower conductive layer 15 and the surface of the upper conductive layer 14 under monitoring through the probe 70. Hence, the closer the probe 70 comes to the leak ingress point 57, the more the capacitance between the probe 70 and the lower conductive layer 15 increases.

This corresponds to an increasing of the voltage between the probe 70 and the lower conductive layer 15. The voltage increasing would continue until the probe 70 has reached the leak ingress point 57, where any deviation from this point 57 will result in a voltage reduction.

Alternative, a change of resistance or impedance between the upper and lower conductive layers 14, 15 can be measured by the control circuitry 100 to locate the leakage ingress point 57 using the probe 70.

Based on the above, the control circuitry 100 can detect the location of the leak ingress point 57 based on the measured voltage signal between the probe 70 and the lower conductive layer 15 with a resolution potentially in the order to few $mm^2$ even when panels 10 having an area in the order of $m^2$ are being employed.

In case that no leakage is found as expected within the identified panel 10, due e.g. to incorrect cabling between the upper and lower electrodes 20, 21 and the control circuitry 100, the search for the leakage using the probe 70 can be extended to the other panels 10.

The control circuitry 100 can store the measurements acquired using the probe 70 and report the detected location of the leak ingress point 57 locally and/or remotely. Once the leak ingress point 57 has been precisely located using the probe 70, the system 1 can return to operate in a leak detection mode based on the sensing grid of upper and lower electrodes 20, 21.

In this way, the control circuitry 100 can determine if the leak has been successfully fixed after a construction or repair intervention. The control circuitry 100 can store and report the detected ceasing of the leak locally and/or remotely.

Although in the embodiment illustrated in FIG. 6 the probe 70 is applied directly on the upper conductive layer 14 of the panel 10 under inspection, in alternative the building covering portion 58 can be maintained over the panel 10, and the probe 70 can be applied to a surface of this portion 58 to detect an upper ingress point of leakage leading, through the thickness of the portion 58, to the lower leakage point 57 at the upper conductive layer 14 of the panel 10.

In this alternative, the control circuitry 100 can be still configured to apply a voltage between the probe 70 and the lower conductive layer 15 of the panel 10 to measure an electrical property therebetween, or preferably the control circuitry 100 can be configured to apply a voltage between the probe 70 and the upper conductive layer 15 to measure an electrical property therebetween. In the latter case, the presence of the upper leakage acts to alter the electrical properties between the upper conductive layer 14 and the surface of the building cover portion under monitoring through the probe 70.

As another alternative, it is possible to use a further membrane in connection with the probe 70 of the type as disclosed in WO2019/063494, in addition to the above disclosed basic system 1, to allow for the accurate location of a leak once it has been detected using the sensing grid of upper and lower electrodes 20, 21.

Furthermore, it will be appreciated that for embodiments based on measuring capacitance as the electrical property between upper and lower electrodes 20, 21, there is the possibility of detecting the presence of a fluid between the electrodes 20, 21 without a physical connection by the fluid between the electrodes being made. This gives the system 1 the ability to detect the presence of small amounts of fluid at a very early stage, prior to a physical connection of the fluid to an electrode. This value will be somewhat less than if the fluid is in contact with a positive electrode, and less again than if the fluid is in contact with both a positive and negative electrode. As a result, it may not always be clear that the fluid is directly connecting one or two electrodes, or if the fluid quantity is increasing initially as it travels between the electrodes 20, 21.

As such, having sensing that can be configured to detect direct connections of fluid between the electrodes using AC resistance (impedance) or DC resistance methods that the sensor can switch between would allow the system 1 to determine when a physical bridge between the electrodes has occurred.

This system 1 would also allow for a double confirmation process. Thus, if a large change of capacitance is seen to occur without a bridging of the electrodes, then it could be seen that something is interfering with the reading and there may not be a fluid present. If the previous case is seen to happen and a direct connection is found to occur, then it could be shown that there is a definite presence of fluid.

This system can also be adopted for use with the probe 70, to give an extra layer of confirmation of a direct bridge at the point of ingress and as to fix being achieved.

The invention claimed is:

1. A system for detecting a leak in a building layer, the system comprising:
   a plurality of dual foil backed insulation panels arranged to cover at least a portion of a base surface of the building layer, each panel including: an insulating body, an upper conductive layer covering an upper surface of the insulating body and a lower conductive layer covering a lower surface of the insulating body;
   a plurality of upper electrodes formed by respective rows of electrically interconnected upper conductive layers of the panels;
   a plurality of lower electrodes formed by respective rows of electrically interconnected lower conductive layers of the panels, the rows of electrically interconnected lower conductive layers forming the lower electrodes being transverse to the rows of electrically interconnected upper conductive layers forming the upper electrodes; and
   a control circuitry configured to:
      apply a voltage between the upper electrodes and the lower electrodes to measure an electrical property therebetween; and
      detect the presence of a leak within the building layer based on at least a measurement of the electrical property between the upper and lower electrodes.

2. The system of claim 1, wherein said control circuitry is configured to:
   apply sequentially said voltage between each pair of upper and lower electrodes; and
   detect the presence of a leak within a panel based on a measurement of the electrical property between the pair of upper and lower electrodes including the upper and lower conductive layers, respectively, of said panel.

3. The system of claim 2, wherein said control circuitry is configured to measure an analog signal present between each pair of upper and lower electrodes, when said voltage is applied between the pair of upper and lower electrodes.

4. The system of claim 1, wherein the control circuitry is configured to swap a polarity of the voltage applied between the upper and lower electrodes to measure the electrical property therebetween.

5. The system of claim 1, wherein said measured electrical property is a capacitance and the control circuitry is configured to pulse the voltage applied between the upper and lower electrodes.

6. The system of claim 1, wherein the upper conductive layers of the panels forming each of the upper electrodes are electrically and mechanically interconnected to each other by first conductive mechanical connectors, and the lower conductive layers of the panels forming each of the lower electrodes are electrically and mechanically interconnected to each other by second conductive mechanical connectors.

7. The system of claim 6, wherein the first and second mechanical connectors comprise Tiger clips.

8. The system of claim 1, wherein the control circuitry is electrically connected to the upper electrodes and the lower electrodes via first wiring and second wiring, respectively, the first wiring being arranged along a first peripheral side of the plurality of panels, and the second wiring being arranged along a second peripheral side of the plurality of panels, the second peripheral side being transverse to the first peripheral side.

9. The system of claim 1, wherein the material of the insulating body of the panels is hydrophilic.

10. The system of claim 1, wherein at least one layer of hydrophilic material is added to the insulating body of the panels.

11. The system of claim 1, wherein the insulating body of the panels is mechanically configured to attenuate a liquid passing therethrough from the upper surface to the lower surface.

12. The system of claim 1, wherein the upper and lower conductive layers of the panels are made of aluminium.

13. The system of claim 1, wherein the insulating body of the panels is both electrically and thermally insulating.

14. The system of claim 1 wherein said insulating body comprises a rigid material.

15. The system of claim 1 wherein said panels are coplanar and arranged side-by-side to cover said base surface.

\* \* \* \* \*